Oct. 27, 1942.　　　A. C. SKOOGLUND　　　2,300,069
PROCESS FOR THE POLYMERIZATION OF OLEFINS TO
HIGH MOLECULAR WEIGHT SUBSTANCES
Filed June 17, 1939
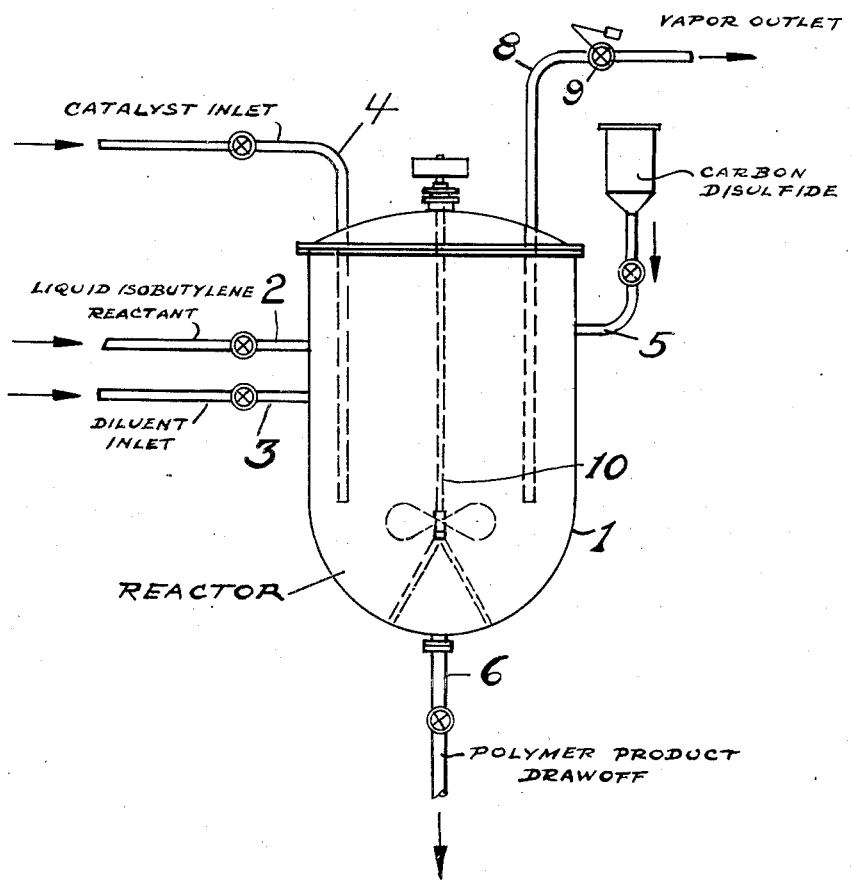
Arthur C. Skooglund Inventor
By　P. L. Young　Attorney Patented Oct. 27, 1942

2,300,069

UNITED STATES PATENT OFFICE 2,300,069

PROCESS FOR THE POLYMERIZATION OF OLEFINS TO HIGH MOLECULAR WEIGHT SUBSTANCES

Arthur C. Skooglund, Clark Township, Union County, N. J., assignor, by mesne assignments, to Jasco, Incorporated, a corporation of Delaware Application June 17, 1939, Serial No. 279,665

8 Claims. (Cl. 260—94)

This invention relates to synthetic polymer materials having a high molecular weight, and relates particularly to a polymerized isoolefinic substance, and to the method of production, utilizing a catalyst aid to increase the polymeric molecular weight.

It has been found that the isoolefinic substances such as isobutylene when treated at low temperatures ranging from 0° C. to —100° C. with a polymerization catalyst of the type of boron trifluoride are polymerized into solid, plastic, elastic materials which are valuable for many purposes such as cable insulation, lacquers, etc. In the production of these materials it is found that the lower the temperature of polymerization and the purer the olefinic material, the higher the molecular weight. Under such suitable circumstances the molecular weight of the polymer may be brought to values ranging from 50,000 to 250,000 depending to a considerable extent upon the purity, and lowness of the temperature. However, these very low temperatures are somewhat expensive and difficult to obtain, and maximum purity of the isobutylene, especially freedom from acidic matter, is also difficult to obtain; and it is, therefore, desirable that the high molecular weight polymers be obtained without the use of exceedingly low temperatures and ultra purity.

The present invention provides a simple addition agent which is capable of increasing materially the molecular weight of polymer obtainable by polymerization at a given temperature and from a given purity of materials. This polymerization improving agent may conveniently take the form of an organic sulfide such as carbon disulfide, or a phenolic sulfide or an aryl sulfide or an alkyl sulfide, which when added to the polymerization mixture of less purity in small proportions at less low temperatures is found to increase the molecular weight of the resulting polymer by from 10% to 50% without the need of ultra purity or ultra low temperature and without any reduction in the yield of polymer or any increase in the catalyst consumption. Thus an object of the invention is to improve and supplement the effect of a polymerization catalyst in the polymerization reaction as applied to an isoolefin by the addition thereto of a catalyst reinforcer such as carbon disulfide or other organic sulfide. Other objects and details of the invention will be apparent from the following disclosure:

In the manufacture of gasoline fuel it has been customary to top the crude oil to obtain the natural gasoline, and then to crack the residual heavy oil for the production of still further quantities of gasoline boiling range hydrocarbons. The cracking operation yields approximately 15% of gaseous by-product composed in large part of a mixture of hydrogen, methane and its homologues, ethylene and its homologues, etc., including isobutylene. The isobutylene is separated from the gas mixture and forms one of the raw materials for the polymerization reaction.

The isobutylene is cooled to a temperature ranging from 0° C. to —100° C., preferably to temperatures between —50° C. and —75° C. It is preferably mixed with a diluent-refrigerant such as liquid ethylene, or liquid propane with solid $CO_2$, and then treated with boron trifluoride as a polymerization catalyst. The addition of the boron trifluoride produces a rapid polymerization reaction which converts the normally gaseous isobutylene into a normally solid, plastic, elastic substance which, in contrast to the highly chemically unsaturated isobutylene from which it was produced, is a substantially chemically saturated solid.

With reasonably pure isobutylene in the proportion of 1 part to 1½ to 4 parts of solid carbon dioxide, and $\frac{1}{1000}$ to $\frac{5}{1000}$ part of boron trifluoride as catalyst at a temperature of approximately —70° C., the resulting polymer usually has a molecular weight of from 60,000 to 80,000.

The process of the invention comprises adding to the reaction mixture of isobutylene and liquefied ethylene an amount of catalyst aid, such as carbon disulfide, ranging from 0.05% to 2%. The addition of this amount of carbon disulfide, followed by the addition of the catalyst, results in an increase in molecular weight of the resulting polymer to values ranging from 100,000 up, according to the other conditions of the polymerization. The addition of the carbon disulfide does not result in any reduction in yield nor does it require the use of any additional quantities of the boron trifluoride catalyst.

It should be noted that the sulfide used should be of good purity, since many sulfur compounds are very poisonous to the polymerization reaction. This is especially true of hydrogen sulfide, which, being an acid type of compound, is particularly harmful to the polymerization reaction, and greatly reduces the molecular weight of polymer obtained. The metallic sulfides are also very harmful, but the insolubility in organic solvents, and at low temperatures, reduces the harm caused by their presence. The mercaptans are also harmful, probably because of the presence of a labile hydrogen atom, analogous to the hydrogen of hydrogen sulfide.

In contrast, the organic sulfides, generally, and especially those which do not have a labile hydrogen, are useful as polymerization aids, as above pointed out, the exact utility and efficiency being dependent in large extent on other features of the compound. The more useful compounds of this type are the phenolic sulfides, aryl sulfides, and alkyl sulfides.

The catalyst aid may be left in the polymer after the completion of the polymerization reaction, especially the carbon disulfide, since it is found that this compound is of great value as a stabilizer in the finished polymer, and when so present very substantially increases the resistance of the polymer to breakdown and to depolymerization from heating and from mechanical working such as milling, as well as other destructive forces.

The same reaction applies to mixtures of iso-olefins and diolefins, and to other catalysts such as aluminum chloride, especially aluminum chloride dissolved in ethyl or methyl chloride, as well as to the various other polymerization catalysts such as titanium tetrachloride, silicon tetrachloride, zinc chloride, germanium chloride, etc., either dissolved directly in the reaction mixture, or in solution in other organic halides.

By the process of the invention there is thus provided a simple, inexpensive and efficient step for increasing the molecular weight of the iso-olefin polymer substance.

A diagrammatic elevational view of an apparatus suitable for carrying out the process of the present invention as illustrated in the accompanying drawing wherein 1 is a reactor into which is fed a liquefied olefinic reactant from inlet 2, a liquid diluent, e. g., liquefied ethylene, from inlet 3, a Friedel-Crafts type catalyst, e. g., boron fluoride, from inlet 4, and a proportioned amount of the carbon disulfide promoter from inlet 5. A draw-off line 6 may be provided to remove the polymer product from the reactor. Diluent may be recovered for reuse by leading vapors from the reactor by way of line 8 thru a pressure control valve 9, then purifying the diluent vapors to the desired extent before they are liquefied and recycled. The reactor may be equipped with a mechanical stirrer 10.

While there are above disclosed but a limited number of embodiments of the device of the invention, it is possible to produce still other embodiments without departing from the inventive concepts herein disclosed and it is therefore desired that only such limitations be imposed on the appended claims as are stated therein or required by the prior art.

The invention claimed is:

1. A process for polymerizing olefinic bodies comprising the steps of condensing an olefinic substance containing isobutylene to a liquid, diluting the condensed olefin with a diluent-refrigerant comprising liquid ethylene at a temperature below 0° C., adding a catalyst aid thereto comprising carbon disulfide, and polymerizing the material to a high molecular weight polymer by the application to the mixture of a Friedel-Crafts type catalyst comprising boron trifluoride the said catalyst aid being present in the ratio of 0.05% to 2% of the iso-olefin.

2. A process for polymerizing olefinic bodies comprising the steps of condensing an olefinic substance containing isobutylene to a liquid, diluting the condensed olefin with a diluent-refrigerant comprising liquid ethylene at a temperature below 0° C., adding a catalyst aid thereto comprising carbon disulfide, and polymerizing the material to a high molecular weight polymer by the application to the mixture of a Friedel-Crafts type catalyst comprising aluminum chloride dissolved in methyl chloride.

3. The method of producing an olefinic polymer substance of high molecular weight comprising the steps of condensing an impure olefin-containing gas to a liquid, cooling the liquid to a moderately low temperature below 0° C., dissolving therein a catalyst aid comprising carbon disulfide, and treating the mixture with a Friedel-Crafts type catalyst comprising boron trifluoride.

4. The method of producing an olefinic polymer substance of high molecular weight comprising the steps of condensing an impure olefin-containing gas to a liquid, cooling the liquid to a moderately low temperature of approximately −40° C., dissolving therein a catalyst aid comprising carbon disulfide, and treating the mixture with a Friedel-Crafts type catalyst comprising boron trifluoride.

5. The method of producing an olefinic polymer substance of high molecular weight comprising the steps of condensing an olefinic gas to a liquid, cooling the liquid to a low temperature below approximately 0° C., dissolving therein a catalyst aid comprising carbon disulfide in a proportion ranging between 0.05% and 2% of the olefin and treating the mixture with a Friedel-Crafts type catalyst in the proportion of 0.1% to 0.5% of the olefinic material.

6. In a process for polymerizing olefinic substances including the steps of condensing the olefinic substances to a liquid at a temperature below 0° C. and polymerizing the condensed liquid by the addition of a Friedel-Crafts type catalyst thereto, the new step of reinforcing the catalyst by the addition of carbon disulfide.

7. Process of polymerizing olefinic hydrocarbons including an iso-olefin reactant at low temperatures below 0° C. comprising the steps of adding to the said hydrocarbons carbon disulfide in a small proportion sufficient to promote the polymerization reaction, and polymerizing said reactant in liquid phase with the aid of a Friedel-Crafts type catalyst.

8. A polymerization mixture comprising a high molecular weight iso-olefin polymerization product and a small proportion of carbon disulfide sufficient to stabilize said product.

ARTHUR C. SKOOGLUND.